(12) United States Patent
Xu et al.

(10) Patent No.: US 10,542,066 B2
(45) Date of Patent: Jan. 21, 2020

(54) METHOD AND SYSTEM FOR MATCHING IMAGE TRANSMISSION BANDWIDTH AND ELECTRONIC DEVICE

(71) Applicant: SMARTECH WORLDWIDE LIMITED, Tortola (VG)

(72) Inventors: Chengai Xu, Shenzhen (CN); Kaifan He, Shenzhen (CN); Qingpeng Ma, Shenzhen (CN); Weiquan Rong, Shenzhen (CN); Rui Tan, Shenzhen (CN)

(73) Assignee: SMARTECH WORLDWIDE LIMITED, Tortola (VG)

( * ) Notice: Subject to any disclaimer, the term of this patent is extended or adjusted under 35 U.S.C. 154(b) by 71 days.

(21) Appl. No.: 15/874,960

(22) Filed: Jan. 19, 2018

(65) Prior Publication Data

US 2018/0213017 A1 Jul. 26, 2018

(30) Foreign Application Priority Data

Jan. 23, 2017 (CN) .......................... 2017 1 0050715

(51) Int. Cl.
| | |
|---|---|
| *H04L 29/06* | (2006.01) |
| *H04N 21/6437* | (2011.01) |
| *H04N 21/2343* | (2011.01) |
| *H04N 21/647* | (2011.01) |
| *H04N 21/442* | (2011.01) |
| *H04N 21/24* | (2011.01) |

(52) U.S. Cl.
CPC ............ *H04L 65/608* (2013.01); *H04L 65/80* (2013.01); *H04N 21/234381* (2013.01); *H04N 21/2402* (2013.01); *H04N 21/44209* (2013.01); *H04N 21/6437* (2013.01); *H04N 21/64738* (2013.01); *H04L 67/42* (2013.01)

(58) Field of Classification Search
CPC ......... H04N 21/23805; H04N 21/6373; H04N 21/2402; H04N 21/234381; H04N 21/64738; H04N 21/44209; H04N 21/6437; H04L 65/608; H04L 65/80; H04L 67/42
See application file for complete search history.

(56) References Cited

U.S. PATENT DOCUMENTS

| | | | |
|---|---|---|---|
| 8,804,508 | B1 | 8/2014 | Hobbs |
| 2013/0304934 | A1* | 11/2013 | Joch ...................... H04L 65/607 709/231 |
| 2016/0295250 | A1* | 10/2016 | Yang .............. H04N 21/234381 |

FOREIGN PATENT DOCUMENTS

| | | |
|---|---|---|
| CN | 1468001 A | 1/2004 |
| CN | 1633177 A | 6/2005 |
| CN | 105979304 A | 9/2016 |

\* cited by examiner

*Primary Examiner* — Shean Tokuta
*Assistant Examiner* — Juan C Turriate Gastulo
(74) *Attorney, Agent, or Firm* — IPro, PLLC

(57) ABSTRACT

A method includes: sending a Real-time Transport Protocol data packet to a client; receiving a bandwidth value and a frame rate value fed back by the client, the bandwidth value and the frame rate value being calculated by parsing the data packet; obtaining a corresponding bandwidth weight according to the bandwidth value, and obtaining a corresponding frame rate weight according to the frame rate value; obtaining a quantization table weight according to the bandwidth weight and the frame rate weight; and matching image transmission data according to the quantization table weight; ands ending matched image data to the client.

9 Claims, 4 Drawing Sheets

Chrominance

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 14 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Luminance

| | | | | | | | |
|---|---|---|---|---|---|---|---|
| 17 | 18 | 24 | 47 | 99 | 99 | 99 | 99 |
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

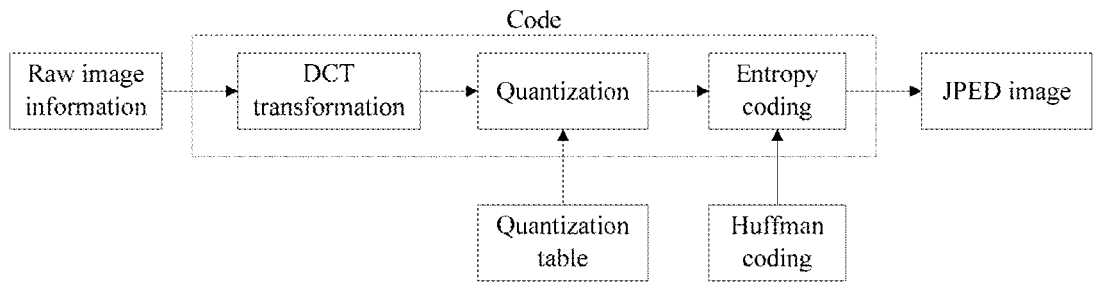
FIG1
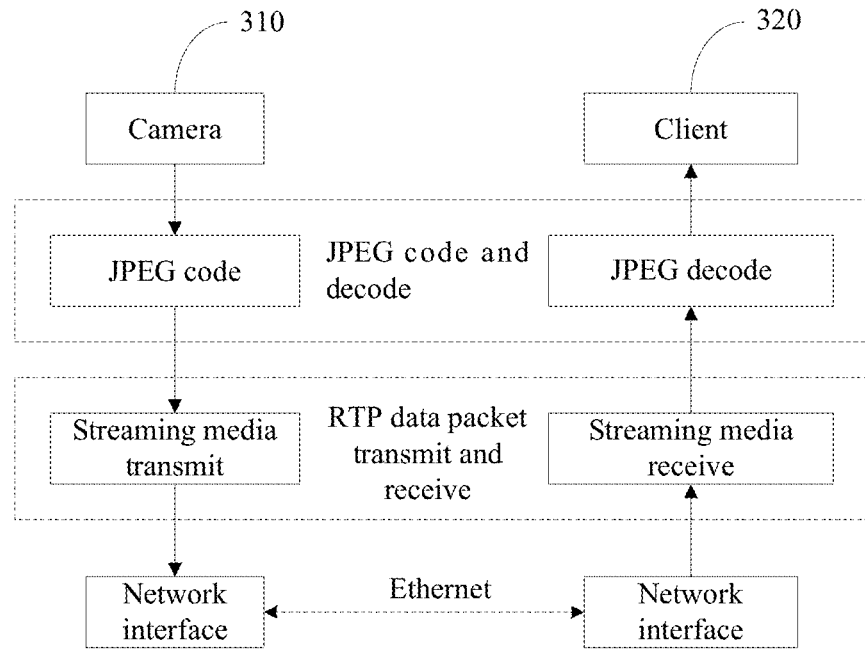
FIG2
FIG3

METHOD AND SYSTEM FOR MATCHING IMAGE TRANSMISSION BANDWIDTH AND ELECTRONIC DEVICE

CROSS-REFERENCE TO RELATED APPLICATIONS

The present disclosure claims priority to Chinese Patent Application No. 201710050715.1, filed with the Chinese Patent Office on Jan. 23, 2017, titled "METHOD, APPARATUS AND SYSTEM FOR MATCHING IMAGE TRANSMISSION BANDWIDTH", the entire contents of which are incorporated herein by reference.

TECHNICAL FIELD

The present disclosure relates to the technical field of video processing, and in particular, relates to a method and a system for matching image transmission bandwidth and an electronic device.

BACKGROUND

With rapid development of the unmanned aerial vehicle industry, people are more and more concerning about smoothness and clarity of aero-photographing. These indicators are mainly dependent on improvement of the performance of the unmanned aerial vehicle image transmission system. At present, small-scaled unmanned aerial vehicle image transmission system mainly supports transmission in the JPEG format, with a resolution of VGA (640×480). JPEG has a large data volume due to restriction of the compression algorithm, and employs 2.4 G WiFi for video stream transmission. This imposes a higher requirement on the transmission bandwidth. Especially, with respect to a low-cost embedded network system, how to improve the frame rate in a limited bandwidth and create a better user experience is a challenge for relevant enterprises.

SUMMARY

An embodiment of the present disclosure provides a method for matching image transmission bandwidth, the method includes: sending a Real-time Transport Protocol data packet to a client; receiving a bandwidth value and a frame rate value fed back by the client, the bandwidth value and the frame rate value being acquired by parsing the data packet; obtaining a corresponding bandwidth weight according to the bandwidth value, and obtaining a corresponding frame rate weight according to the frame rate value; obtaining a quantization table weight according to the bandwidth weight and the frame rate weight; and matching image transmission data according to the quantization table weight; and sending matched image data to the client.

Another embodiment of the present disclosure provides a method for matching image transmission bandwidth, the method includes: receiving a Real-time Transport Protocol data packet sent by a server; parsing the Real-time Transport Protocol data packet to acquire a bandwidth value and a frame rate value, and feeding back the bandwidth value and the frame rate value to the server via the sent Real-time Transport Protocol data packet, such that the server obtains a corresponding bandwidth weight according to the bandwidth value, obtaining a corresponding frame rate weight according to the frame rate value, and obtaining a quantization table weight according to the bandwidth weight and the frame rate weight; and receiving matched image data that is obtained after the server matches image transmission data according to the quantization table weight.

Still another embodiment of the present disclosure provides an electronic device, the electronic device includes: a memory and a processor coupled to the memory; the memory storing instructions that are executable by the processor, wherein execution of the instructions by the processor causes the processor to send a Real-time Transport Protocol data packet to a client; receive a bandwidth value and a frame rate value fed back by the client, the bandwidth value and the frame rate value being acquired by parsing the data packet; obtain a corresponding bandwidth weight according to the bandwidth value, and obtain a corresponding frame rate weight according to the frame rate value; obtain a quantization table weight according to the bandwidth weight and the frame rate weight; match image transmission data according to the quantization table weight; and send matched image data to the client.

Still another embodiment of the present disclosure provides an electronic device, the electronic device includes: a memory and a processor coupled to the memory; the memory storing instructions that are executable by the processor, wherein execution of the instructions by the processor causes the processor to receive a Real-time Transport Protocol data packet sent by a server; parse the Real-time Transport Protocol data packet to acquire a bandwidth value and a frame rate value, and feed back the bandwidth value and the frame rate value to the server via the sent Real-time Transport Protocol data packet, such that the server obtains a corresponding bandwidth weight according to the bandwidth value, obtains a corresponding frame rate weight according to the frame rate value, and obtain a quantization table weight according to the bandwidth weight and the frame rate weight; and receive matched image data that is obtained after the server matches image transmission data according to the quantization table weight.

Still another embodiment of the present disclosure provides a system for matching image transmission bandwidth. the system includes a server and a client, the server is configured to send a Real-time Transport Protocol data packet to the client; receive a bandwidth value and a frame rate value fed back by the client, the bandwidth value and the frame rate value being acquired by parsing the data packet; obtain a corresponding bandwidth weight according to the bandwidth value, and obtain a corresponding frame rate weight according to the frame rate value; obtain a quantization table weight according to the bandwidth weight and the frame rate weight; and match image transmission data according to the quantization table weight; send matched image data to the client;

the client is configured to receive a Real-time Transport Protocol data packet sent by the server; parse the Real-time Transport Protocol data packet to acquire a bandwidth value and a frame rate value; feed back the bandwidth value and the frame rate value to the server via the sent Real-time Transport Protocol data packet; and receive the matched image data.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

FIG. 1 is a schematic diagram of JPEG image coding;

FIG. 2 is a schematic diagram of an application scenario according to an embodiment of the present disclosure;

FIG. 3 is a schematic diagram of a standard quantization table;

DETAILED DESCRIPTION

Figure 4:
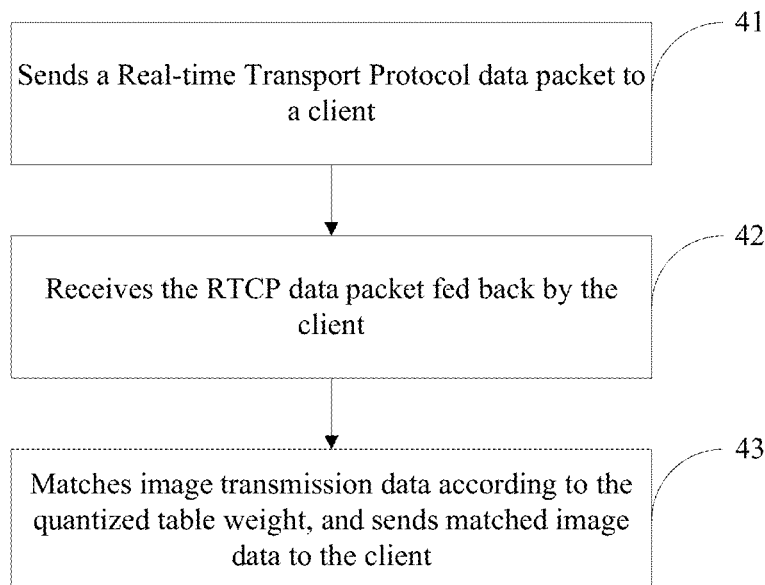
FIG. 4 is a flowchart of a method for matching image transmission bandwidth according to the embodiment of the present disclosure.

In order to make the objective, technical solution, and advantages of the present application clearer, the present application is further described with reference to specific embodiments and attached drawings. It should be understood that the specific embodiments described herein are only intended to explain the present application instead of limiting the present application.

Referring to FIG. 1, raw image information generally has a large data volume, and in most occasions the raw image information is coded into a JPED image for storage and transfer. After a raw image is coded, a corresponding JPEG image may be generated. The coding process specifically includes: DCT transformation, quantization and entropy coding.

A raw image that is subjected to no processing is formed of various colors, that is, various colors in a plane. This plane is formed of a plurality of dots in both a horizontal direction and a vertical direction. In practice, the color of each dot, that is, the color of each pixel point that may be represented by a computer, may be decomposed into red, green and blue, i.e., tricolors of RGB. An actual color value may be obtained by mixing these three colors at a specific proportion.

Therefore, in practice, the image on the plane may be understood as a three-dimensional system further having a Z direction with a color value in addition to the horizontal X and the vertical Y. Z represents the specific value of mixture of the three branch colors R/G/B in the three element colors. A mixture value of RGB of each pixel may be different from another, and the values are some larger and some smaller. However, the values of R/G/B of two adjacent dots may be close to each other.

The raw image is formed of a plurality of independent pixel points, and thus the pixel points are discrete and dispersed. For example, an image having a dimension of 640×480 means that 640 pixel points are present in the horizontal direction and 480 pixel points are present in the vertical direction.

As mentioned above, colors at two adjacent dots may be close to each other. If the undesired data is recorded as least as possible in the final resulted image, a compression effect is achieved.

The spectral lines of image signals are generally within the range of 0 to 6 MHz, and in addition, an image includes components having various frame rate. However, most of the components are low-frequency spectral lines, and only signals at the image edge which occupies a small proportion of the image region include high-frequency spectral lines. This is a theoretical basis of JPEG image compression.

Therefore, during digital processing of an image, bits may be assigned according to the spectrum factors: allocating more bits for a low-frequency spectral region having a large information volume, and allocating few bits for a high-frequency spectral region. The image quality is subject to no visible damages, and thus data compression is achieved.

The color spatial domain of the raw image is converted into a spectral domain by means of discrete cosine transform (DCT) in mathematics.

The DCT is reversible and discrete orthogonal transformation. The transformation process does not exert a compression effect, but the frame rate coefficient upon the transformation is very favorable to bit rate compression. That is, a DCT transformation coefficient is obtained through this transformation process.

The coefficient obtained through the DCT transformation may be further processed, that is, quantization. Through the quantization, the data compression effect is achieved.

The quantization process is practically an optimization process for the DCT coefficient. The quantization process greatly simplifies data based on the feature that human eyes are insensitive to high-frequency portions. The quantization process is practically to divide each component in the frame rate domain by a constant relative to the component, and take a closest integer via rounding. Considering this result, the components having a high frame rate are generally rounded such that the components are close to 0, and the remaining components may become small positive or negative numbers. The entire quantization is intended to reduce the amplitude of the non-zero-valued coefficients and increase the number of zero-valued coefficients.

The quantization is a major cause to reduction of the image quality. Since human eyes are more sensitive to luminance signals over color difference signals, two quantization tables are used: luminance quantization values and color difference quantization values. The quantization matrix and the above obtained DCT coefficient matrix, for example, −415 (DCT coefficient), are used, and the DCT is practically a space-domain low-pass filter from the perspective of the closest integer obtained via rounding. Fine quantization is carried out for the Y component, and coarse quantization is carried out for the UV component.

The quantization table is critical to control of the JPEG compression ratio, and this step eliminates some high-frequency components. Another important reason is that a color transition is present between points in all pictures, and a large amount of image information is included in low frame rates. After the quantization, in the high-frequency segments, a large number of contiguous zeros are present. The core of the JPEG quantization is the quantization table. Joint Photographic Experts Group (JPEG) has recommended two quantization tables: chrominance and luminance. Referring to FIG. 2, the quantization table is acquired from statistics collection and experiments of a large amount of natural images, and is superior in the aspects of natural vision and image matching and the like with people, which is assigned according to a ratio of a compression amount of a high-frequency portion to a compression amount of a low-frequency portion.

Subsequently, the quantized data is coded, including two entropy coding modes: Huffman coding and arithmetic coding.

Using the Huffman coding as an example, the Huffman coding assigns a binary code having a small character length to characters that have a great probability of occurrence, and assigns a binary code having a large character length to characters that have a small probability of occurrence, such that the average coding length of the characters is the shortest.

Through the above process, when the image is coded to remove redundant information thereof, the forward DCT (FDCT) in the DCT needs to be used, and then the coefficient upon the transformation is quantized to process the high-frequency data to which the human eye visual system is insensitive. In this way, the data volume that needs to be processed is greatly reduced. The processing is based on the mathematic method and empirical values.

FIG. 3 illustrates a possible application scenario of a method for matching image transmission bandwidth according to an embodiment of the present disclosure. In some possible application scenarios, as illustrated in FIG. 3, the application scenario includes a camera 310 and a client 320. The camera 310 is connected to the client 320 via WiFi. The camera 310 transmits a Real-time Transport Protocol (RTP) data packet to the client 320 in real time, and the client 320 receives the RTP data packet, parses the RTP data packet and acquires a bandwidth value and a frame rate value. The client 320 then feeds back the bandwidth value and the frame rate value to the camera 310 via the sent RTP data packet. When performing JPEG coding for the transmitted image data, the camera 310 selects a quantization table according to the bandwidth value and the frame rate value, and matches the image quality and the bandwidth value of a WiFi connection channel according to the quantization table. When the current bandwidth value is large, a higher image quality is acquired by JPEG coding; and when the current bandwidth value is small, a lower image quality is acquired by JPEG coding. Subsequently, the camera 310 sends the matched image experiencing JPEG coding to the client 320.

Conventionally, if the camera 310 needs to transmit an image, the image needs to be coded and then transmitted via a WiFi channel. In each transmission, the image quality experiencing coding is stationary. When the bandwidth of the WiFi channel is insufficient, the bandwidth of the WiFi channel is not sufficient to transmit image data formed by coding, and lagging is caused during data transmission. When the bandwidth of the WiFi channel is sufficient, after the image data is transmitted, some bandwidth remains, which causes a waste of bandwidth resources. Another image transmission method mentions that a bandwidth value is determined and then a file which is satisfying the current bandwidth value is selected to transmit. This method may fully utilize the bandwidth resources. However, this method is generally not applicable to real-time image transmission.

Returned to FIG. 3, in a possible application scenario according to an embodiment of the present application, the camera 310 matches the bandwidth value and the image data to be transmitted according to the current WiFi channel. In this method, the bandwidth resources may be fully utilized to transmit real-time images.

Referring to FIG. 4, an embodiment of the present disclosure provides a method for matching image transmission bandwidth. The method is performed by a server, and includes the following steps:

41: A server sends a Real-time Transport Protocol data packet to a client.

The server is connected to a client via the Internet, WiFi or the like. The server sends a Real-time Transport Protocol (RTP) data packet to the client, and the client receives the RTP data packet, parses the RTP data packet and calculates a bandwidth value and a frame rate value. Then the client feeds back the bandwidth value and the frame rate value to the server via a Real-time Transport Control Protocol (RTCP) data packet.

42: The server receives the RTCP data packet fed back by the client, parses the RTCP data packet to acquire the bandwidth value and the frame rate value, respectively obtains a corresponding bandwidth weight and a corresponding frame rate weight according to the bandwidth value and the frame rate value, and obtains a quantization table weight according to the bandwidth weight and the frame rate weight.

The server acquires the bandwidth value and a frame rate value of a current transmission channel by parsing the RTCP data packet. The quantization table weight may be calculated according to the bandwidth value and the frame rate value of the current transmission channel.

Before the quantization table weight is calculated, assess the bandwidth value or the frame rate value to be different grades. different bandwidth weights are assigned to different grades of bandwidth values, and different frame rate weights to different grades of frame rate values.

Factors for evaluating bandwidth pressure of the channel over which the server and the client are communicated with each other include the bandwidth value and the frame rate value. The bandwidth reflects the current network condition, and the frame rate may directly affect user experience. For example, when an image is transmitted between the server and the client via WiFi connection, the bandwidth of WiFi is easily affected by interference caused by the surrounding radio signals, and thus the bandwidth value is affected. The frame rate of the WiFi connection channel is determined by the current bandwidth and the quality of the transmitted image. Through a test, a mildly complicated JPEG image data stream is generally 40 KB, due to the afterglow effect, human eyes fail to identify moving images over 16 frames; and when the frame rate is over 25 frames, users may feel very smooth. Based on the above standard, the grade and weight of the bandwidth and the frame rate are defined. Referring to Table 1:

TABLE 1

| Indicator | Value | Grade | Weight |
|---|---|---|---|
| Bandwidth | B > 1M | Good | 2 |
| Bandwidth | 800K < B « 1M | Medium | 1 |
| Bandwidth | B < 800N | Poor | 0 |
| Frame rate | F > 25 | Good | 2 |
| Frame rate | 16 ≤ F ≤ 25 | Medium | 1 |
| Frame rate | F < 16 | Poor | 0 |

A bandwidth value greater than 1 Mbit/s is assessed to be good, and a weight 2 is assigned to this grade.

A bandwidth value greater than 800 kbit/s and equal to 1 Mbit/s is assessed to be medium, and a weight 1 is assigned to this grade.

A bandwidth value less than 800 kbit/s is assessed to be poor, and a weight 0 is assigned to this grade.

A frame rate value greater than 25 MHz is assessed to be good, and a weight 2 is assigned to this grade.

A frame rate value greater than 16 MHz and less than 25 MHz is assessed to be medium, and a weight 1 is assigned to this grade.

A frame rate value less than 16 MHz is assessed to be poor, and a weight 0 is assigned to this grade.

The weight of the quantization table may be calculated according to the assigned bandwidth weight and frame rate weight. Specifically, the weight of the bandwidth and the weight of the frame rate are added as the weight of the quantization table, that is, quantization table value=bandwidth weight+frame rate weight. If the assigned weights of the bandwidth or frame rate in various grades in Table 1 are added, five calculation results, "4, 3, 2, 1 and 0" may be obtained. These five calculation results are used as the weight of the quantization table. A greater weight of the quantization table indicates a greater transmission bandwidth of the transmission channel, which may be used to transmit high-quality images.

43: The server matches image transmission data according to the quantized table weight, and sends matched image data to the client.

The matching image transmission data includes: increase, decrease or maintain the matrix data of the standard quantized table, according to the quantization table weights.

During the quantization process, two pieces of 8×8 quantization matrix data are needed. One is for dedicatedly processing quantization matrix data of frame rate coefficients with respect to luminance, and the other is for processing quantization matrix data of frame rate coefficients with respect to chrominance, and dividing the frame rate coefficient by the value of the quantization matrix and rounding the value. In this way, the quantization process is completed. After the frame rate coefficient is quantized, the frame rate coefficient is changed from a floating point number to an integer, which is convenient for the final coding. After the quantization stage, integer approximations are only remained for all the data, and thus some data content is lost. Since different precision requirements are imposed on luminance and chrominance, different quantization tables are employed for luminance and chrominance. The former is fine quantization and the latter is coarse quantization.

According to the weights of different quantization tables, an increase operation, a decrease operation and a maintain current data operation may be performed for the values of the matrix data in the standard quantization table. Referring to Table 2:

TABLE 2

| Indicator | Weight | Quantization table option |
| --- | --- | --- |
| Quantization table | A = 4 | Standard quantization table |
| Quantization table | 0 < A < 4 | Standard quantization table * 1.25 |
| Quantization table | A = 0 | Standard quantization table * 1.75 |

If the calculated weight is greater than or equal to 4, the standard quantization table is selectively used.

If the quantization table weight is greater than 0 and less than 4, each piece of data in the standard quantization table is multiplied by 1.25 and then used.

If the quantization table weight is equal to 0, each piece of data in the standard quantization table is multiplied by 1.75 and then used.

As such, if the quantization table weight is equal to 4, the frame rate coefficient is divided by the standard quantization matrix data, and the value of the data obtained upon the quantization is greater.

If the quantization table weigh is greater than 0 and less than 4, the frame rate coefficient is divided by the standard quantization matrix data and the multiplied by 1.25, and the value of the data obtained upon the quantization is smaller.

If the quantization table weigh is equal to 0, the frame rate coefficient is divided by the standard quantization matrix data and the multiplied by 1.75, and the value of the data obtained upon the quantization is the minimum.

Corresponding quantization table values are selected for quantization according to the quantization table weights, and the quantized data is coded to genera images. A greater quantization table weight indicates a higher quality of the coded image.

This embodiment provides a method for matching image transmission bandwidth. With the method, a quantization table weight is calculated according to a bandwidth value and a frame rate value, quantization table values are selected for quantization according to the quantization table weight, a suitable quantization table may be selected for quantization according to the current bandwidth such that images of different qualities may be selected for transmission according to different bandwidths. When the network condition is poor or the frame rate is low, the quantization table is increased to reduce the image quality, thereby relieving the bandwidth pressure. When the network condition is good or the frame rate is high, the quantization table is decreased to improve the image quality, thereby creating a better user experience.

Figure 5:
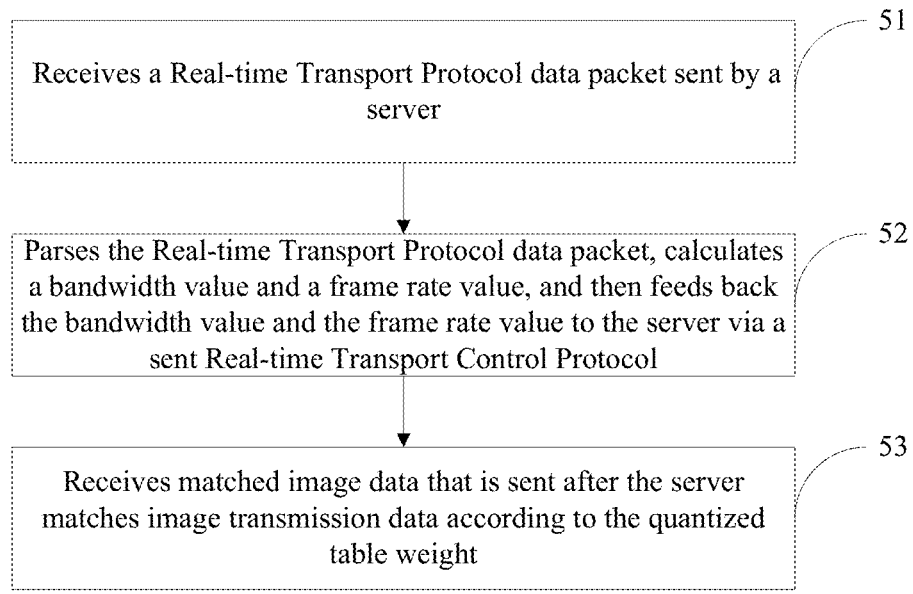
FIG. 5 is a flowchart of a method for matching transmission bandwidth according to another embodiment of the present disclosure.

Referring to FIG. 5, another embodiment of the present disclosure provides a method for matching image transmission bandwidth. The method is performed by a client, and includes:

51: A client receives a Real-time Transport Protocol data packet sent by a server. The client is connected to the server via the Internet, WiFi or the like. The client receives a Real-time Transport Protocol (RTP) data packet sent by the server.

52: The client parses the Real-time Transport Protocol data packet, calculates a bandwidth value and a frame rate value, and then feeds back the bandwidth value and the frame rate value to the server via a sent Real-time Transport Control Protocol (RTCP) data packet.

The server acquires a bandwidth value and a frame rate value of a current transmission channel by parsing the RTCP data packet. The quantization table weight may be calculated according to the bandwidth value and the frame rate value of the current transmission channel.

Before the quantization table weight is calculated, perform a grade assessment according to the bandwidth value or the frame rate value, corresponding bandwidth weights are assigned to different grades of bandwidth values, and corresponding frame rate weights to different grades of frame rate values.

Factors for evaluating bandwidth pressure of the channel over which the server and the client are communicated with each other include the bandwidth value and the frame rate value. The bandwidth reflects the current network condition, and the frame rate may directly affect user experience. For example, when an image is transmitted between the server and the client via WiFi connection, the bandwidth of WiFi is easily affected by interference caused by the surrounding radio signals, and thus the bandwidth value is affected. The frame rate of the WiFi connection channel is determined by the current bandwidth and the quality of the transmitted image. Through a test, a mildly complicated JPEG image data stream is generally 40 KB, due to the afterglow effect, human eyes fail to identify moving images over 16 frames; and when the frame rate is over 25 frames, users may feel very smooth. Based on the above standard, the grade and weight of the bandwidth and the frame rate are defined. Referring to Table 3:

TABLE 3

| Indicator | Value | Grade | Weight |
|---|---|---|---|
| Bandwidth | B > 1M | Good | 2 |
| Bandwidth | 800K < B ≪ 1M | Medium | 1 |
| Bandwidth | B < 800K | Poor | 0 |
| Frame rate | F > 25 | Good | 2 |
| Frame rate | 16 ≤ F ≤ 25 | Medium | 1 |
| Frame rate | F < 16 | Poor | 0 |

A bandwidth value greater than 1 Mbit/s is assessed to be good, and a weight 2 is assigned to this grade.

A bandwidth value greater than 800 kbit/s and equal to 1 Mbit/s is assessed to be medium, and a weight 1 is assigned to this grade.

A bandwidth less than 800 kbit/s is assessed to be poor, and a weight 0 is assigned to this grade.

A frame rate value greater than 25 MHz is assessed to be good, and a weight 2 is assigned to this grade.

A frame rate value greater than 16 MHz and less than 25 MHz is assessed to be medium, and a weight 1 is assigned to this grade.

A frame rate value less than 16 MHz is assessed to be poor and a weight 0 is assigned to this grade.

The weight of the quantization table may be calculated according to the assigned bandwidth weight and frame rate weight. Specifically, the weight of the bandwidth and the weight of the frame rate are added as the weight of the quantization table, that is, quantization table value=bandwidth weight+frame rate weight. If the assigned weights of the bandwidth or frame rate in various grades in Table 1 are added, five calculation results, "4, 3, 2, 1 and 0" may be obtained. These five calculation results are used as the weight of the quantization table. A greater weight of the quantization table indicates a greater transmission bandwidth of the transmission channel, which may be used to transmit high-quality images.

53: The client receives matched image data that is sent after the server matches image transmission data according to the quantized table weight.

The matching image transmission data includes: according to the quantization table weights, performing an increase operation, a decrease operation or a maintain current data operation for the matrix data of a standard quantized table according to the quantized table weight.

During the quantization process, two pieces of 8×8 quantization matrix data are needed. One is for dedicatedly processing quantization matrix data of frame rate coefficients with respect to luminance, and the other is for processing quantization matrix data of frame rate coefficients with respect to chrominance, and dividing the frame rate coefficient by the value of the quantization matrix and rounding the value. In this way, the quantization process is completed. After the frame rate coefficient is quantized, the frame rate coefficient is changed from a floating point number to an integer, which is convenient for the final coding. After the quantization stage, integer approximations are only remained for all the data, and thus some data content is lost. Since different precision requirements are imposed on luminance and chrominance, different quantization tables are employed for luminance and chrominance. The former is fine quantization and the latter is coarse quantization.

According to the weights of different quantization tables, increase, decrease or maintain the matrix data of the standard quantized table. Referring to Table 4:

TABLE 4

| Indicator | Weight | Quantization table option |
|---|---|---|
| Quantization table | A = 4 | Standard quantization table |
| Quantization table | 0 < A < 4 | Standard quantization table * 1.25 |
| Quantization table | A = 0 | Standard quantization table * 1.75 |

If the calculated weight is greater than or equal to 4, the standard quantization table is selectively used.

If the quantization table weight is greater than 0 and less than 4, each piece of data in the standard quantization table is multiplied by 1.25 and then used.

If the quantization table weight is equal to 0, each piece of data in the standard quantization table is multiplied by 1.75 and then used.

As such, if the quantization table weight is equal to 4, the frame rate coefficient is divided by the standard quantization matrix data, and the value of the data obtained upon the quantization is greater.

If the quantization table weigh is greater than 0 and less than 4, the frame rate coefficient is divided by the standard quantization matrix data and the multiplied by 1.25, and the value of the data obtained upon the quantization is smaller.

If the quantization table weigh is equal to 0, the frame rate coefficient is divided by the standard quantization matrix data and the multiplied by 1.75, and the value of the data obtained upon the quantization is the minimum.

Corresponding quantization table values are selected for quantization according to the quantization table weights, and the quantized data is coded to genera images. A greater quantization table weight indicates a higher quality of the coded image.

The embodiment provides a method for matching image transmission bandwidth. With the method, a quantization table weight is calculated according to a bandwidth value and a frame rate value, quantization table values are selected for quantization according to the quantization table weight, a suitable quantization table may be selected for quantization according to the current bandwidth, and images of different qualities are formed by coding the quantized data. Images of different qualities may be selected for transmission according to different bandwidths. When the network condition is poor or the frame rate is low, the quantization table is increased to reduce the image quality, thereby relieving the bandwidth pressure. When the network condition is good or the frame rate is high, the quantization table is decreased to improve the image quality, thereby creating a better user experience.

Figure 6:
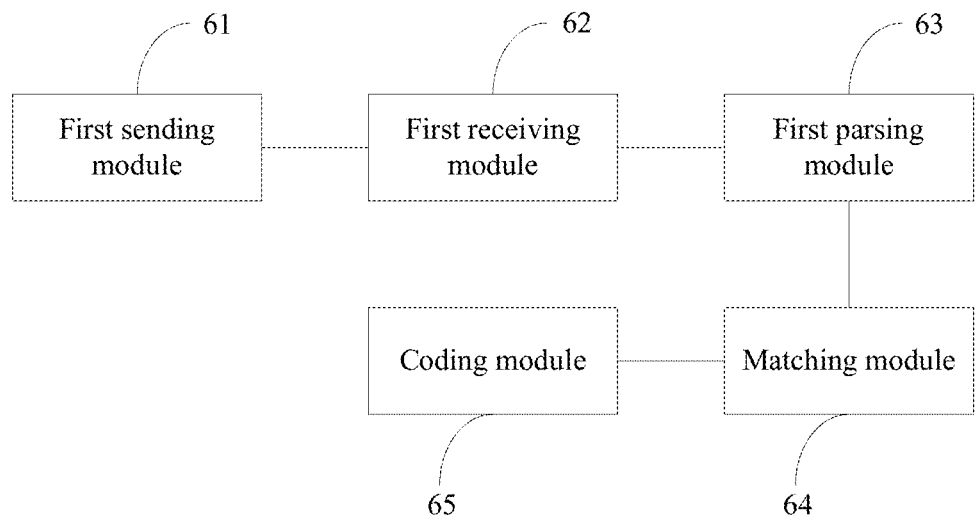
FIG. 6 is a schematic structural block diagram of an apparatus for matching image transmission bandwidth according to the embodiment of the present disclosure.

Referring to FIG. 6, the embodiment of the present disclosure provides an apparatus for matching image transmission bandwidth. The apparatus includes: a first sending module 61, a first receiving module 62, a first parsing module 63 and a matching module 64.

The first sending module 61 is configured to send a Real-time Transport Protocol data packet to a client.

The server is connected to a client via the Internet, WiFi or the like. The sending module 61 sends a Real-time Transport Protocol (RTP) data packet to the client, and the client receives the RTP data packet, parses the RTP data packet and calculates a bandwidth value and a frame rate value. Then the client feeds back the bandwidth value and the frame rate value to the server via a Real-time Transport Control Protocol (RTCP) data packet.

The first receiving module 62 is configured to receive a bandwidth value and a frame rate value fed back by the client.

The first parsing module 63 is configured to parse the RTCP data packet received by the receiving module 62 and acquire the bandwidth value and the frame rate value, respectively obtain a corresponding bandwidth weight and a corresponding frame rate weight according to the bandwidth value and the frame rate value, and calculated a quantization table weight according to the bandwidth weight and the frame rate weight.

Before the quantization table weight is calculated by the first parsing module 63, perform a grade assessment according to the bandwidth value or the frame rate value, corresponding bandwidth weights is assigned to different grades of bandwidth values, and corresponding frame rate weights is assigned to different grades of frame rate values.

Factors for evaluating bandwidth pressure of the channel over which the server and the client are communicated with each other include the bandwidth value and the frame rate value. The bandwidth reflects the current network condition, and the frame rate may directly affect user experience. For example, when an image is transmitted between the server and the client via WiFi connection, the bandwidth of WiFi is easily affected by interference caused by the surrounding radio signals, and thus the bandwidth value is affected. The frame rate of the WiFi connection channel is determined by the current bandwidth and the quality of the transmitted image. Through a test, a mildly complicated JPEG image data stream is generally 40 KB, due to the afterglow effect, human eyes fail to identify moving images over 16 frames; and when the frame rate is over 25 frames, users may feel very smooth. Based on the above standard, the grade and weight of the bandwidth and the frame rate are defined. Referring to Table 5:

TABLE 5

| Indicator | Value | Grade | Weight |
|---|---|---|---|
| Bandwidth | B > 1M | Good | 2 |
| Bandwidth | 800K < B ≪ 1M | medium | 1 |
| Bandwidth | B < 800K | Poor | 0 |
| Frame rate | F > 25 | Good | 2 |
| Frame rate | 16 ≤ F ≤ 25 | Medium | 1 |
| Frame rate | F < 16 | Poor | 0 |

A bandwidth value greater than 1 Mbit/s is assessed to be good, and a weight 2 is assigned to this grade.

A bandwidth value greater than 800 kbit/s and equal to 1 Mbit/s is assessed to be medium, and a weight 1 is assigned to this grade.

A bandwidth less than 800 kbit/s is assessed to be poor, and a weight 0 is assigned to this grade.

A frame rate value greater than 25 MHz is assessed to be good, and a weight 2 is assigned to this grade.

A frame rate value greater than 16 MHz and less than 25 MHz is assessed to be medium, and a weight 1 is assigned to this grade.

A frame rate value less than 16 MHz is assessed to be poor, and a weight 0 is assigned to this grade.

The first parsing module 63 may calculate the weight of the quantization table according to the assigned bandwidth weight and frame rate weight. Specifically, the weight of the bandwidth and the weight of the frame rate are added as the weight of the quantization table, that is, quantization table value=bandwidth weight+frame rate weight. If the assigned weights of the bandwidth or frame rate in various grades in Table 1 are added, five calculation results, "4, 3, 2, 1 and 0" may be obtained. These five calculation results are used as the weight of the quantization table. A greater weight of the quantization table indicates a greater transmission bandwidth of the transmission channel, which may be used to transmit high-quality images.

The matching module 64 is configured to match image transmission data according to the quantized table weight.

The first sending module 61 is further configured to send matched image data to the client.

The matching module 64 is further configured to: according to the quantization table weights, perform an increase operation, a decrease operation or a maintain current data operation for values of matrix data in a standard quantized table according to the quantized table weight.

During the quantization process performed by the matching module 64, two pieces of 8×8 quantization matrix data are needed. One is for dedicatedly processing quantization matrix data of frame rate coefficients with respect to luminance, and the other is for processing quantization matrix data of frame rate coefficients with respect to chrominance, and dividing the frame rate coefficient by the value of the quantization matrix and rounding the value. In this way, the quantization process is completed. After the frame rate coefficient is quantized, the frame rate coefficient is changed from a floating point number to an integer, which is convenient for the final coding. After the quantization stage, integer approximations are only remained for all the data, and thus some data content is lost. Since different precision requirements are imposed on luminance and chrominance, different quantization tables are employed for luminance and chrominance. The former is fine quantization and the latter is coarse quantization.

According to the weights of different quantization tables, the matching module 64 performs an increase operation, a decrease operation and a maintain current data operation for the values of the matrix data in the standard quantization table. Referring to Table 6:

TABLE 6

| Indicator | Weight | Quantization table option |
|---|---|---|
| Quantization table | A = 4 | Standard quantization table |
| Quantization table | 0 < A < 4 | Standard quantization table * 1.25 |
| Quantization table | A = 0 | Standard quantization table * 1.75 |

If the calculated weight is greater than or equal to 4, the standard quantization table is selectively used.

If the quantization table weight is greater than 0 and less than 4, each piece of data in the standard quantization table is multiplied by 1.25 and then used.

If the quantization table weight is equal to 0, each piece of data in the standard quantization table is multiplied by 1.75 and then used.

As such, if the quantization table weight is equal to 4, the frame rate coefficient is divided by the standard quantization matrix data, and the value of the data obtained upon the quantization is greater.

If the quantization table weigh is greater than 0 and less than 4, the frame rate coefficient is divided by the standard quantization matrix data and the multiplied by 1.25, and the value of the data obtained upon the quantization is smaller.

If the quantization table weigh is equal to 0, the frame rate coefficient is divided by the standard quantization matrix data and the multiplied by 1.75, and the value of the data obtained upon the quantization is the minimum.

The apparatus further includes: a coding module 65, configured to code the quantized data to genera an JPEG image. A greater quantization table weight indicates a higher quality of the finally JPEG image.

The embodiment provides an apparatus for matching image transmission bandwidth. With the apparatus, a quantization table weight is calculated according to a bandwidth value and a frame rate value, quantization table values are selected for quantization according to the quantization table weight, a suitable quantization table may be selected for quantization according to the current bandwidth, and images of different qualities are formed by coding the quantized data. Images of different qualities may be selected for transmission according to different bandwidths. When the network condition is poor or the frame rate is low, the quantization table is increased to reduce the image quality, thereby relieving the bandwidth pressure. When the network condition is good or the frame rate is high, the quantization table is decreased to improve the image quality, thereby creating a better user experience.

Figure 7:
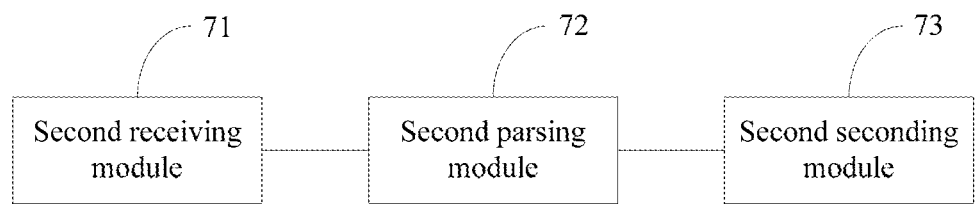
FIG. 7 is a schematic structural block diagram of an apparatus for matching image transmission bandwidth according to the embodiment of the present disclosure.

Referring to FIG. 7, another embodiment of the present disclosure provides an apparatus for matching image transmission bandwidth. The apparatus includes: a second receiving module 71, a second parsing module 72 and a second sending module 73.

The second receiving module 71 is configured to receive a real-time transport protocol data packet sent by a server.

The client is connected to the server via the Internet, WiFi or the like. The second receiving module 71 receives a Real-time Transport Protocol (RTP) data packet sent by the server.

The second parsing module 72 is configured to parse the real-time transport protocol data packet to calculate a bandwidth value and a frame rate value.

The second sending module 73 is configured to feed back the bandwidth value and the frame rate value to the server via a Real-time Transport Control Protocol (RTCP) data packet.

Before the quantization table weight is calculated, a grade assessment according to the bandwidth value or the frame rate value, different bandwidth weights are assigned to different grades of bandwidth values, and different frame rate weights to different grades of frame rate values.

Factors for evaluating bandwidth pressure of the channel over which the server and the client are communicated with each other include the bandwidth value and the frame rate value. The bandwidth reflects the current network condition, and the frame rate may directly affect user experience. For example, when an image is transmitted between the server and the client via WiFi connection, the bandwidth of WiFi is easily affected by interference caused by the surrounding radio signals, and thus the bandwidth value is affected. The frame rate of the WiFi connection channel is determined by the current bandwidth and the quality of the transmitted image. Through a test, a mildly complicated JPEG image data stream is generally 40 KB, due to the afterglow effect, human eyes fail to identify moving images over 16 frames; and when the frame rate is over 25 frames, users may feel very smooth. Based on the above standard, the grade and weight of the bandwidth and the frame rate are defined. Referring to Table 7:

TABLE 7

| Indicator | Value | Grade | Weight |
|---|---|---|---|
| Bandwidth | B > 1M | Good | 2 |
| Bandwidth | 800K < B « 1M | Medium | 1 |
| Bandwidth | B < 800K | Poor | 0 |
| Frame rate | F > 25 | Good | 2 |
| Frame rate | 16 ≤ F ≤ 25 | Medium | 1 |
| Frame rate | F < 16 | Poor | 0 |

A bandwidth value greater than 1 Mbit/s is assessed to be good, and a weight 2 is assigned to this grade.

A bandwidth value greater than 800 kbit/s and equal to 1 Mbit/s is assessed to be medium, and a weight 1 is assigned to this grade.

A bandwidth less than 800 kbit/s is assessed to be poor, and a weight 0 is assigned to this grade.

A frame rate value greater than 25 MHz is assessed to be good, and a weight 2 is assigned to this grade.

A frame rate value greater than 16 MHz and less than 25 MHz is assessed to be medium, and a weight 1 is assigned to this grade.

A frame rate value less than 16 MHz is assessed to be poor, and a weight 0 is assigned to this grade.

The weight of the quantization table may be calculated according to the assigned bandwidth weight and frame rate weight. Specifically, the weight of the bandwidth and the weight of the frame rate are added as the weight of the quantization table, that is, quantization table value=bandwidth weight+frame rate weight. If the assigned weights of the bandwidth or frame rate in various grades in Table 1 are added, five calculation results, "4, 3, 2, 1 and 0" may be obtained. These five calculation results are used as the weight of the quantization table. A greater weight of the quantization table indicates a greater transmission bandwidth of the transmission channel, which may be used to transmit high-quality images.

The second receiving module 73 is further configured to receive matched image data that is obtained after the server matches image transmission data according to the quantized table weight.

The matching image transmission data includes: according to the quantization table weights, performing an increase operation, a decrease operation or a maintain current data operation for values of matrix data in a standard quantized table according to the quantized table weight.

During the quantization process, two pieces of 8×8 quantization matrix data are needed. One is for dedicatedly processing quantization matrix data of frame rate coefficients with respect to luminance, and the other is for processing quantization matrix data of frame rate coefficients with respect to chrominance, and dividing the frame rate coefficient by the value of the quantization matrix and rounding the value. In this way, the quantization process is completed. After the frame rate coefficient is quantized, the frame rate coefficient is changed from a floating point number to an integer, which is convenient for the final coding. After the quantization stage, integer approximations are only remained for all the data, and thus some data content is lost. Since different precision requirements are imposed on luminance and chrominance, different quantization tables are employed for luminance and chrominance. The former is fine quantization and the latter is coarse quantization.

According to the weights of different quantization tables, an increase operation, a decrease operation and a maintain current data operation may be performed for the values of the matrix data in the standard quantization table. Referring to Table 8:

TABLE 8

| Indicator | Weight | Quantization table option |
|---|---|---|
| Quantization table | A = 4 | Standard quantization table |
| Quantization table | 0 < A < 4 | Standard quantization table * 1.25 |
| Quantization table | A = 0 | Standard quantization table * 1.75 |

If the calculated weight is greater than or equal to 4, the standard quantization table is selectively used.

If the quantization table weight is greater than 0 and less than 4, each piece of data in the standard quantization table is multiplied by 1.25 and then used.

If the quantization table weight is equal to 0, each piece of data in the standard quantization table is multiplied by 1.75 and then used.

As such, if the quantization table weight is equal to 4, the frame rate coefficient is divided by the standard quantization matrix data, and the value of the data obtained upon the quantization is greater.

If the quantization table weigh is greater than 0 and less than 4, the frame rate coefficient is divided by the standard quantization matrix data and the multiplied by 1.25, and the value of the data obtained upon the quantization is smaller.

If the quantization table weigh is equal to 0, the frame rate coefficient is divided by the standard quantization matrix data and the multiplied by 1.75, and the value of the data obtained upon the quantization is the minimum.

Corresponding quantization table values are selected for quantization according to the quantization table weights, and the quantized data is coded to form images. A greater quantization table weight indicates a higher quality of the finally formed image.

The embodiment provides an apparatus for matching image transmission bandwidth. With the apparatus, a quantization table weight is calculated according to a bandwidth value and a frame rate value, quantization table values are selected for quantization according to the quantization table weight, a suitable quantization table may be selected for quantization according to the current bandwidth, and images of different qualities are formed by coding the quantized data. Images of different qualities may be selected for transmission according to different bandwidths. When the network condition is poor or the frame rate is low, the quantization table is increased to reduce the image quality, thereby relieving the bandwidth pressure. When the network condition is good or the frame rate is high, the quantization table is decreased to improve the image quality, thereby creating a better user experience.

Figure 8:
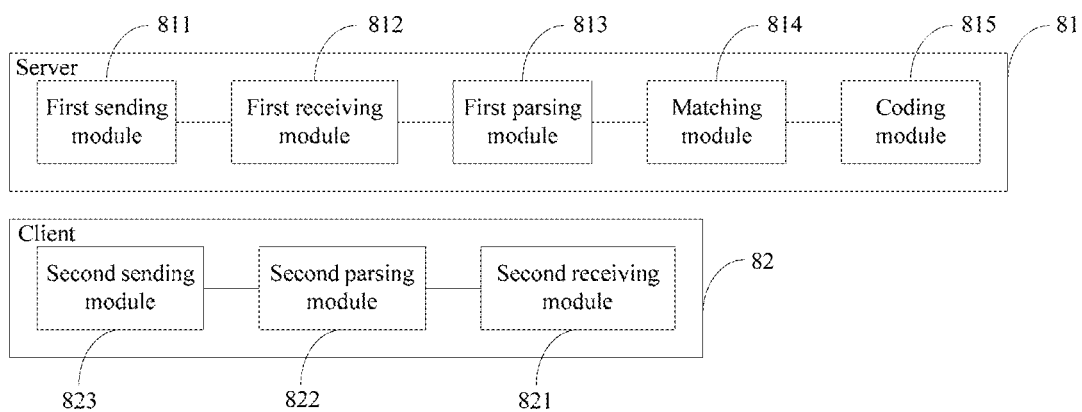
FIG. 8 is a schematic structural block diagram of a system for matching image transmission bandwidth according to the embodiment of the present disclosure.

Referring to FIG. 8, an embodiment of the present disclosure provides a system for matching image transmission bandwidth. The system includes a server 81 and a client 82.

The server 81 includes: a first sending module 811 configured to send a Real-time Transport Protocol data packet to a client, a first receiving module 812, a first parsing module 813, and a matching module 814.

The first sending module 811 is further configured to send matched image data to the client.

The first receiving module 812 is configured to receive a bandwidth value and a frame rate value fed back by the client.

The first parsing module 813 is configured to parse the real-time transport protocol data packet received by the receiving module to obtain the bandwidth value and a frame rate value, obtain a corresponding bandwidth weight according to the bandwidth value, obtain a corresponding frame rate weight according to the frame rate value, and obtain a quantized table weight according to the bandwidth weight and the frame rate weight.

Before the quantization table weight is calculated by the first parsing module 813, a grade assessment according to the bandwidth value or the frame rate value, different bandwidth weights are assigned to different grades of bandwidth values, and different frame rate weights to different grades of frame rate values.

The first parsing module 813 may calculate the weight of the quantization table according to the assigned bandwidth weight and frame rate weight. Specifically, the weight of the bandwidth and the weight of the frame rate are added as the weight of the quantization table, that is, quantization table value=bandwidth weight+frame rate weight. If the assigned weights of the bandwidth or frame rate in various grades are added, five calculation results, "4, 3, 2, 1 and 0" may be obtained. These five calculation results are used as the weight of the quantization table. A greater weight of the quantization table indicates a greater transmission bandwidth of the transmission channel, which may be used to transmit high-quality images.

The matching module 814 is configured to match image transmission data according to the quantized table weight.

The matching module 814 is further configured to: perform an increase operation, a decrease operation or a maintain current data operation for values of matrix data in a standard quantized table according to the quantized table weight.

During the quantization process performed by the matching module 814, two pieces of 8×8 quantization matrix data are needed. One is for dedicatedly processing quantization matrix data of frame rate coefficients with respect to luminance, and the other is for processing quantization matrix data of frame rate coefficients with respect to chrominance, and dividing the frame rate coefficient by the value of the quantization matrix and rounding the value. In this way, the quantization process is completed. After the frame rate coefficient is quantized, the frame rate coefficient is changed from a floating point number to an integer, which is convenient for the final coding. After the quantization stage, integer approximations are only remained for all the data, and thus some data content is lost. Since different precision requirements are imposed on luminance and chrominance, different quantization tables are employed for luminance and chrominance. The former is fine quantization and the latter is coarse quantization.

According to the weights of different quantization tables, the matching module 814 performs an increase operation, a decrease operation and a maintain current data operation for the values of the matrix data in the standard quantization table.

The sever 81 further includes: a coding module 815, configured to code the quantized data to form an image. A greater quantization table weight indicates a higher quality of the finally formed image.

The client 82 includes: a second receiving module 821, a second parsing module 822 and a second sending module 823.

The second receiving module 821 is configured to receive a real-time transport protocol data packet sent by a server.

The second parsing module 822 is configured to parse the real-time transport protocol data packet to calculate a bandwidth value and a frame rate value.

The second parsing module 822 calculates a bandwidth value and a frame rate value of a current transmission channel by parsing the real-time transport protocol data packet, such that the server respectively obtains a corresponding bandwidth weight and frame rate weight according to the bandwidth value and the frame rate value, and obtains a quantization table weight according to the bandwidth weight and the frame rate weight.

The second sending module 823 is configured to feed back the bandwidth value and the frame rate value to the server via a sent Real-time Transport Control Protocol (RTCP) data packet, such that the server obtains a corresponding bandwidth weight according to the bandwidth value, obtains a corresponding frame rate weight according to the frame rate value, and obtains a quantized table weight according to the bandwidth weight and the frame rate weight.

The second receiving module 821 is further configured to receive matched image data that is obtained after the server matches image transmission data according to the quantized table weight.

The embodiment provides a system for matching image transmission bandwidth. In the system, a quantization table weight is calculated according to a bandwidth value and a frame rate value, quantization table values are selected for quantization according to the quantization table weight, a suitable quantization table may be selected for quantization according to the current bandwidth, and images of different qualities are formed by coding the quantized data. Images of different qualities may be selected for transmission according to different bandwidths. When the network condition is poor or the frame rate is low, the quantization table is increased to reduce the image quality, thereby relieving the bandwidth pressure. When the network condition is good or the frame rate is high, the quantization table is decreased to improve the image quality, thereby creating a better user experience.

Figure 9:
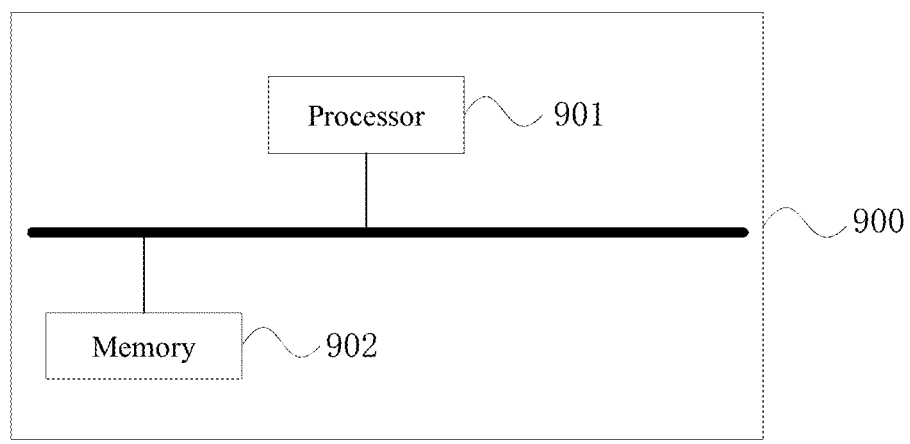
FIG. 9 is a schematic structural diagram of an electronic device according to the present application.

FIG. 9 is a schematic structural diagram illustrating hardware of an electronic device 900 for performing a method for matching image transmission bandwidth according to an embodiment of the present disclosure.

As illustrated in FIG. 9, the electronic device 900 includes: at least one processor 901 and a memory 902, and FIG. 9 uses one processor as an example.

The at least one processor 901 and the memory 902 may be connected via a bus or in another manner, and FIG. 9 uses connection via the bus as an example.

The memory 902, as a non-volatile computer readable storage medium, may be used to store non-volatile software programs, and non-volatile computer executable programs and modules. The non-volatile software programs, instructions and modules stored in the memory 901, when being executed, cause the processor 902 to perform various function applications and data processing, that is, performing the methods for matching image transmission bandwidth according to the above method embodiments.

The memory 902 may also include a program storage area and a data storage area. The program storage area may store an operating system and an application implementing at least one function. The data storage area may be created according to use of an image transmission bandwidth matching apparatus. In addition, the memory 902 may include a high speed random access memory, or include a non-volatile memory, for example, at least one disk storage device, a flash memory device, or another non-volatile solid storage device.

One or more modules are stored in the memory 902, and when being executed by the at least one processor 901, perform the method for matching image transmission bandwidth in any of the above method embodiments.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

The electronic device in the embodiments of the present disclosure is practiced in various forms, including, but not limited to:

(1) a mobile communication device: which has the mobile communication function and is intended to provide mainly voice and data communications; such terminals include: a smart phone (for example, an iPhone), a multimedia mobile phone, a functional mobile phone, a low-end mobile phone and the like;

(2) an ultra mobile personal computer device: which pertains to the category of personal computers and has the computing and processing functions, and additionally has the mobile Internet access feature; such terminals include: a PDA, an MID, an UMPC device and the like, for example, an iPad;

(3) a portable entertainment device: which displays and plays multimedia content; such devices include: an audio or video player (for example, an iPod), a palm game machine, an electronic book, and a smart toy, and a portable vehicle-mounted navigation device; and (4) another electronic device having the data interaction function.

An embodiment of the present disclosure further provides a non-volatile computer-readable storage medium. The non-volatile computer-readable storage medium stores computer-executable instructions, which, when being executed by at least one processor, for example, the processor 901 as illustrated in FIG. 9, may cause the at least one processor to perform the method for matching image transmission bandwidth in any of the above embodiments.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Described above are exemplary embodiments of the present invention, but are not intended to limit the scope of the present invention. Any equivalent structure or equivalent process variation made based on the specification and drawings of the present invention, which is directly or indirectly applied in other related technical fields, fall within the scope of the present invention.

What is claimed is:

1. A method for matching image transmission bandwidth, comprising:
    sending a Real-time Transport Protocol data packet to a client;
    receiving a bandwidth value and a frame rate value fed back by the client, the bandwidth value and the frame rate value being calculated by parsing the data packet;
    performing a grade assessment according to the bandwidth value;
    obtaining a corresponding bandwidth weight according to a grade of the bandwidth value;
    performing a grade assessment according to the frame rate value;
    obtaining a corresponding frame rate weight according to a grade of the frame rate value;
    obtaining a quantization table weight according to a sum of the bandwidth weight and the frame rate weight;
    matching image transmission data according to the quantization table weight; and
    sending matched image data to the client.

2. The method according to claim 1, wherein the matching image transmission data according to the quantization table weight comprises:
    increasing, decreasing or maintaining a matrix data of a standard quantization table according to the quantization table weight.

3. A method for matching image transmission bandwidth, comprising:
    receiving a Real-time Transport Protocol data packet sent by a server;
    parsing the Real-time Transport Protocol data packet to calculate a bandwidth value and a frame rate value;
    feeding back the bandwidth value and the frame rate value to the server via the sent Real-time Transport Protocol data packet, such that the server performs a grade assessment according to the bandwidth value, obtains a corresponding bandwidth weight according to a grade of the bandwidth value, performs a grade assessment according to the frame rate value, obtains a corresponding frame rate weight according to a grade of the frame rate value, and obtains a quantization table weight according to a sum of the bandwidth weight and the frame rate weight; and
    receiving matched image data that is obtained after the server matches image transmission data according to the quantization table weight.

4. The method according to claim 3, wherein the matching image transmission data according to the quantization table weight comprises:
    increasing, decreasing or maintaining a matrix data of a standard quantization table according to the quantization table weight.

5. An electronic device comprising:
    a memory and a processor coupled to the memory;
    the memory storing instructions that are executable by the processor, wherein execution of the instructions by the processor causes the processor to:
    send a Real-time Transport Protocol data packet to a client;
    receive a bandwidth value and a frame rate value fed back by the client, the bandwidth value and the frame rate value being calculated by parsing the data packet;
    perform a grade assessment according to the bandwidth value;
    obtain a corresponding bandwidth weight according to a grade of the bandwidth value;
    perform a grade assessment according to the frame rate value;
    obtain a corresponding frame rate weight according to a grade of the frame rate value;
    obtain a quantization table weight according to a sum of the bandwidth weight and the frame rate weight;
    match image transmission data according to the quantization table weight; and
    send matched image data to the client.

6. The electronic device according to claim 5, wherein the matching image transmission data according to the quantization table weight comprises:
    increasing, decreasing or maintaining a matrix data of a standard quantization table according to the quantization table weight.

7. An electronic device, comprising:
    a memory and a processor coupled to the memory;
    the memory storing instructions that are executable by the processor, wherein execution of the instructions by the processor causes the processor to
    receive a Real-time Transport Protocol data packet sent by a server;
    parse the Real-time Transport Protocol data packet to calculate a bandwidth value and a frame rate value;
    feed back the bandwidth value and the frame rate value to the server via the sent Real-time Transport Protocol data packet, such that the server performs a grade assessment according to the bandwidth value, obtains a corresponding bandwidth weight according to a grade of the bandwidth value, performs a grade assessment according to the frame rate value, obtains a corresponding frame rate weight according to a grade of the frame rate value, and obtains a quantization table weight according to a sum of the bandwidth weight and the frame rate weight; and
    receive matched image data that is obtained after the server matches image transmission data according to the quantization table weight.

8. The electronic device according to claim 7, wherein the matching image transmission data according to the quantization table weight comprises:
    increasing, decreasing or maintaining a matrix data of a standard quantization table according to the quantization table weight.

9. A system for matching image transmission bandwidth, comprising a server and a client; wherein the server is configured to:

send a Real-time Transport Protocol data packet to the client;

receive a bandwidth value and a frame rate value fed back by the client, the bandwidth value and the frame rate value being acquired by parsing the data packet;

perform a grade assessment according to the bandwidth value;

obtain a corresponding bandwidth weight according to a grade of the bandwidth value;

perform a grade assessment according to the frame rate value;

obtain a corresponding frame rate weight according to a grade of the frame rate value;

obtain a quantization table weight according to a sum of the bandwidth weight and the frame rate weight;

match image transmission data according to the quantization table weight; and send matched image data to the client;

the client is configured to:

receive the Real-time Transport Protocol data packet sent by the server;

parse the Real-time Transport Protocol data packet to acquire a bandwidth value and a frame rate value;

feed back the bandwidth value and the frame rate value to the server via the sent Real-time Transport Protocol data packet; and receive the matched image data.

\* \* \* \* \*